United States Patent
Harris et al.

(10) Patent No.: US 6,304,265 B1
(45) Date of Patent: Oct. 16, 2001

(54) SYSTEM FOR DISTINGUISHING FRONT FACING AND BACK FACING PRIMITIVES IN A COMPUTER GRAPHICS SYSTEM USING AREA CALCULATIONS IN HOMOGENEOUS COORDINATES

(75) Inventors: Kathleen A. Harris; Kimberly Wagner Jensen, both of Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/016,171

(22) Filed: Jan. 30, 1998

(51) Int. Cl.[7] .................................................. G06T 15/40
(52) U.S. Cl. ............................................................ 345/421
(58) Field of Search .............................................. 345/421

(56) References Cited

U.S. PATENT DOCUMENTS

| | | | |
|---|---|---|---|
| 5,428,718 | * | 6/1995 | Peterson et al. ........................ 395/123 |
| 5,499,234 | * | 3/1996 | Nakayama ............................. 395/129 |
| 5,886,711 | * | 3/1999 | Rossin et al. .......................... 345/503 |

OTHER PUBLICATIONS

"Interactive Computer Graphics: A top–down Approach with OpenGL"—Edward Angel, Section 2.1.1,2.3.3,7.2, 1997.*

"Computer Graphics": James D.Foley, Anries Van Dam, Steven Feiner, John Hughes; Sections:14.4.1,15,2,4. 18.3.7, Appendix, 1992.*

"Computer Graphics": James D.Foley, Andries Van Dam, Steven Feiner, John Hughes; Section: 6.5, 1992.*

* cited by examiner

Primary Examiner—Mark Zimmerman
Assistant Examiner—Mano Padmanabhan (57) ABSTRACT

The present invention directed to a method and apparatus for distinguishing between front facing and back facing polygons in a computer graphics environment. The method determines whether the polygon is a triangle, a quadrilateral, or a polygon with more than four vertices. Then the method computes the area of the polygon using a first formula, if the determining step determines the polygon to be a triangle. If the determining step determines the polygon to be a quadrilateral, then the method computes the area of the polygon using a second formula. Finally, if the determining step determines the polygon to be a polygon with more than four vertices, then the method computes the area of the polygon using a third formula. Each of the formulas—the first formula, the second formula, and the third formula— differ from one another. In the preferred embodiment, the apparatus is implemented in micro-code of a integrated circuit chip (although an alternative embodiment may be implemented in a software graphics pipeline). In this regard, a significant aspect of the present invention is that the calculation and evaluations of the present invention take place in/using homogeneous coordinates, and before clipping is performed.

23 Claims, 6 Drawing Sheets

Line Loop

Triangle Fan
or Polygon

Line Strip

Triangle Strip

Quad Strip

SYSTEM FOR DISTINGUISHING FRONT FACING AND BACK FACING PRIMITIVES IN A COMPUTER GRAPHICS SYSTEM USING AREA CALCULATIONS IN HOMOGENEOUS COORDINATES

BACKGROUND OF THE INVENTION

1. Field of the Invention

The present invention relates to computer graphics systems and, more particularly, to a system and method for differentiating front facing graphics primitives from back facing graphics primitives in a computer graphics system.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and $\alpha$) color values of each vertex. Alpha is a transparency value. Additional primitive data may be used in specific applications. Rendering hardware interpolates the primitive data to compute the display screen pixels that represent each primitive, and the R, G, B and $\alpha$ values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. Additional data transmitted from the host computer to the geometry accelerator includes illumination parameters, clipping parameters and any other parameters needed to generate the graphics display.

Various techniques have been employed to improve the performance of geometry accelerators. These including pipelining, parallel processing, reducing redundancy, minimizing computations, etc. by or in a geometry accelerator. Indeed, the processing of graphics information is generally so computationally intense that virtually any method of speeding up this process is desirable. One way of improving the throughput of a geometry accelerator is to minimize the overall amount of data that must be processed by it. For example, this can be done by minimizing redundancy in the data being sent to the geometry accelerator. This may also be accomplished by eliminating data sent to the geometry accelerator that relates to graphics information that will not be displayed on the display. For example, if data relates to graphics information that is outside the viewing window of the display, or relates to graphics information that is behind the eye of the viewer, then the geometry accelerator need not process that data.

Another known manner of reducing the data sent to the geometry accelerator for processing is achieved eliminating unnecessary processing of data that, although within the graphics display window (or field of view), is to be culled or otherwise not displayed. For example, in a completely enclosed surface constructed from polygons with a consistent orientation, none of the back facing polygons are visible (as they are always obscured by the front-facing polygons). In such an instance, drawing speed may be increased by culling, or discarding, such polygons as soon at they are determined to be back facing. For example, OpenGL (which is a widely used graphics API that is rapidly becoming an industry standard), offers a robust, yet flexible, programming interface, and permits a graphics programmer to specify whether to enable culling non-visible primitives of a graphics image.

Importantly, and as it relates to the present invention, a computer graphics system often needs to determine whether a polygon or other graphics primitive is a front facing or back facing polygon. For example, in an OpenGL environment, if culling is enabled, then as soon as a graphics primitive is determined to be back facing, it may be discarded and not further processed by the graphics pipeline (e.g., the geometry accelerator).

By convention, polygons whose vertices appear in counterclockwise order on the screen are called front-facing (although this convention may be reversed through an OpenGL command). Stated another way, the decision of whether a face of a polygon is front facing or back facing is determined by the sign of the area of the polygon. Several, less than optimal, ways are presently known to make this computation. For example, OpenGL specifies a process of differentiating front and back facing primitives/polygons by transforming them to window coordinates, and then performing the area calculation in window coordinates (clipped or unclipped). One way that OpenGL specifies computing this area is through the equation:

$$a = \frac{1}{2}\sum_{i=0}^{n-1} x_i y_{i\oplus 1} - x_{i\oplus 1} y_i,$$ (Equation 1)

where $x_i$ and $y_i$ are the x and y window coordinates of the ith vertex of the n-vertex polygon, and $i\oplus 1$ is (i+1) mod n.

Unfortunately, one disadvantage of this approach is that it necessarily results in excessive work to be done and needless computations to be performed. Specifically, this approach requires that the system perform a transformation to window coordinates and, in most graphics systems, clipping is performed before the transformation to window coordinates. For polygons that are later determined to be back facing, and thus not visible, these additional steps and computations are wasted and thus consume additional processor time.

Another known approach for determining front facing and back facing polygons utilizes a dot product computation of a normal vector to the polygon. The normal vector is typically derived from the cross-product of two vectors formed from three consecutive vertices of the polygon and the vector <0,0,1> or <0,0,−1>, depending upon whether the coordinate system is left or right handed. The calculation of the normal vector is performed in object coordinates (or eye coordinates), and the z coordinate of the normal vector is transformed to window coordinates. Mathematically, this method is equivalent to the area calculation for triangles, described above.

The disadvantage, however, of this method is that it uses only three points of a polygon. While this method provides satisfactory results for triangular primitives, for polygons with more than three vertices, if the first three vertices are substantially colinear, then floating point round-off errors can result in inaccurate computation (i.e., incorrect differentiation between front facing and back facing polygons). Further still, if the first three vertices are precisely colinear, the algorithm must so determine and search for additional vertices, or the computation will fail.

Accordingly, it is desired to provide an improved system and method for differentiating between front facing and back facing primitives in a computer graphics system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for determining whether a graphics polygon is front facing or back facing. In accordance with a broad aspect of the invention, a method distinguishes front facing from back facing polygons by processing graphics data in clip coordinates. A significant benefit of this aspect of the invention is that it processes the data before transformation into window coordinates and before clipping, and therefore significantly reduces unnecessary processing of data that, ultimately will not be visible to a user. For example, data that is culled from view.

In accordance with this aspect of the invention, the method determines whether the polygon is a triangle, a quadrilateral, or a polygon with more than four vertices. Then the method computes the area of the polygon using a first formula, if the determining step determines the polygon to be a triangle. If the determining step determines the polygon to be a quadrilateral, then the method computes the area of the polygon using a second formula. Finally, if the determining step determines the polygon to be a polygon with more than four vertices, then the method computes the area of the polygon using a third formula. Each of the formulas—the first formula, the second formula, and the third formula—differ from one another. In accordance with one embodiment, the area of the polygon may be computed by dividing the polygon into a triangle fan graphics primitive, computing areas of the individual triangles, and comparing the computed areas of the triangles.

In accordance with another aspect of the invention, a method is provided for processing graphics data in a computer graphics environment. In accordance with this aspect, the method evaluates, in clip coordinates, a plurality of polygons comprising a graphics image, to identify those polygons that are not visible. The method then transforms to window coordinates the polygons comprising the graphics image and which are visible to an observer, eliminating from the transformation the not visible polygons identified in the evaluating step. Then, the method clips the transformed polygons. Finally, the method processes the clipped polygons for display.

In accordance with another aspect of the invention, an apparatus is provided for differentiating between front facing polygons and back facing polygons in a computer graphics system. Preferably, the apparatus is implemented in micro-code of a integrated circuit chip that forms part of the graphics machine. In this regard, the apparatus includes a first code segment configured to determine whether the polygon is a triangle, a quadrilateral, or a polygon with more than four vertices. A second code segment is configured to compute the area of the polygon using a first formula, if the polygon is determined to be a triangle. A third code segment is configured to compute the area of the polygon using a second formula, if the polygon is determined to be a quadrilateral. Finally, a fourth code segment is configured to compute the area of the polygon using a third formula, if the polygon is determined to be a polygon having more than four vertices, the first, second and third formulas being different from each other.

Consistent with the broad concepts and teachings of the invention, the apparatus and method described above may be implemented in a software graphics pipeline, as opposed to being either hardwired or micro-coded into a geometry accelerator of a hardware graphics pipeline. In this regard, computations, similar to those described above will be carried out in software routines toward the front end of the graphics process.

It will be appreciated that a significant aspect of the invention is that the relevant computations take place in homogeneous clip coordinates before clipping, and give correct results, even if the w coordinates are not all positive.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the present invention above, reference will now be made in detail to the description of the invention as illustrated by the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Definitions

As previously mentioned, the present invention is directed to a system and method that differentiates between front facing and back facing primitives in a computer graphics system. Before beginning the description of the illustrated embodiment, a few terms relevant to this technological area will first be defined.

Clip Coordinates refer to the coordinate system between transformation by a projection matrix and perspective division.

Culling refers to the process of eliminating a front face or a back face of a polygon so that it is not drawn.

Eye Coordinates refer to the coordinate system that follows transformation by a modelview matrix and that precedes transformation by a projection matrix. Generally, lighting and application-specific clipping are performed in eye coordinates.

Face (either front face or back face) refers to one side of a polygon. Every polygon has a front face and a back face. However, only one face or the other is ever visible in the window for a planar polygon.

Homogeneous Coordinates refer to a set of n+1 coordinates used to represent points in n-dimensional projective space. Thus, points in three-dimensional space are defined by the homogeneous coordinates X, Y, Z, and W. Points in projective space can be thought of as points in Euclidean space (including points at infinity). The coordinates are referred to as homogeneous because a scaling of each of the coordinates by the same nonzero constant doesn't alter the three-dimensional point to which the coordinates refer. For this reason, homogeneous coordinates are useful in the calculations of projective geometry, and thus in computer graphics, where objects and scenes are projected onto a window.

Primitive refers to a graphics object. Although primitives are often triangles or polygons, they can be a point, line segment, triangle, polygon, bitmap, or an image.

Projection Matrix refers to the 4×4 matrix that transforms primitives from eye coordinates to clip coordinates.

Window Coordinates refer to the coordinates or coordinate system of a window. It is important to distinguish between pixel coordinates, which are discrete, and the window-coordinate system, which is continuous. For example, the pixel at the lower left corner of a window is generally referred to as pixel (0,0). The window coordinates of the center of this pixel are (0.5, 0.5, z), wherein z denotes a depth component, which is also continuous.

The Computer Graphics Pipeline

Figure 1:
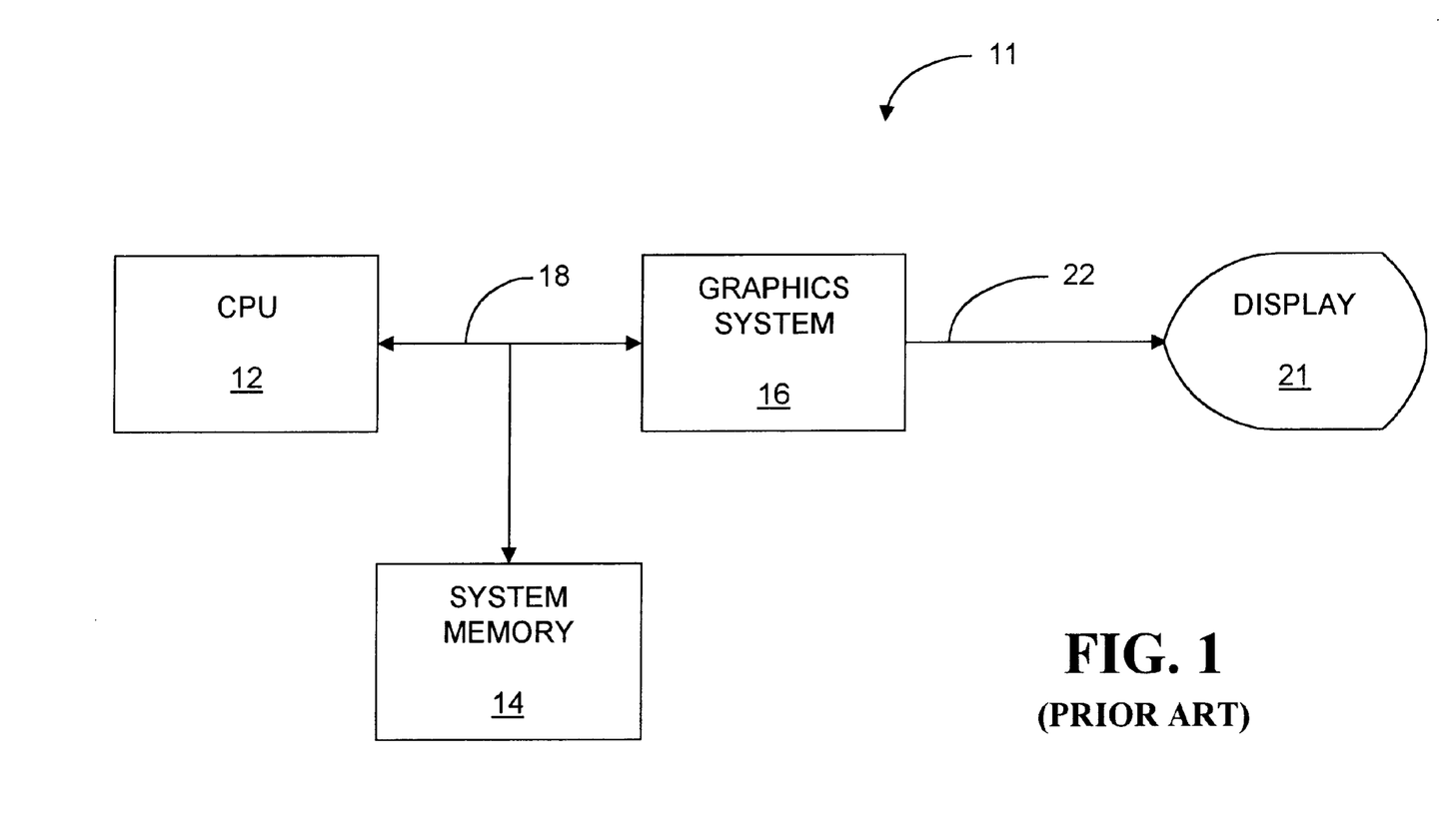
FIG. 1 illustrates a block diagram of a computer graphics system as is known in the prior art.
Figure 2:
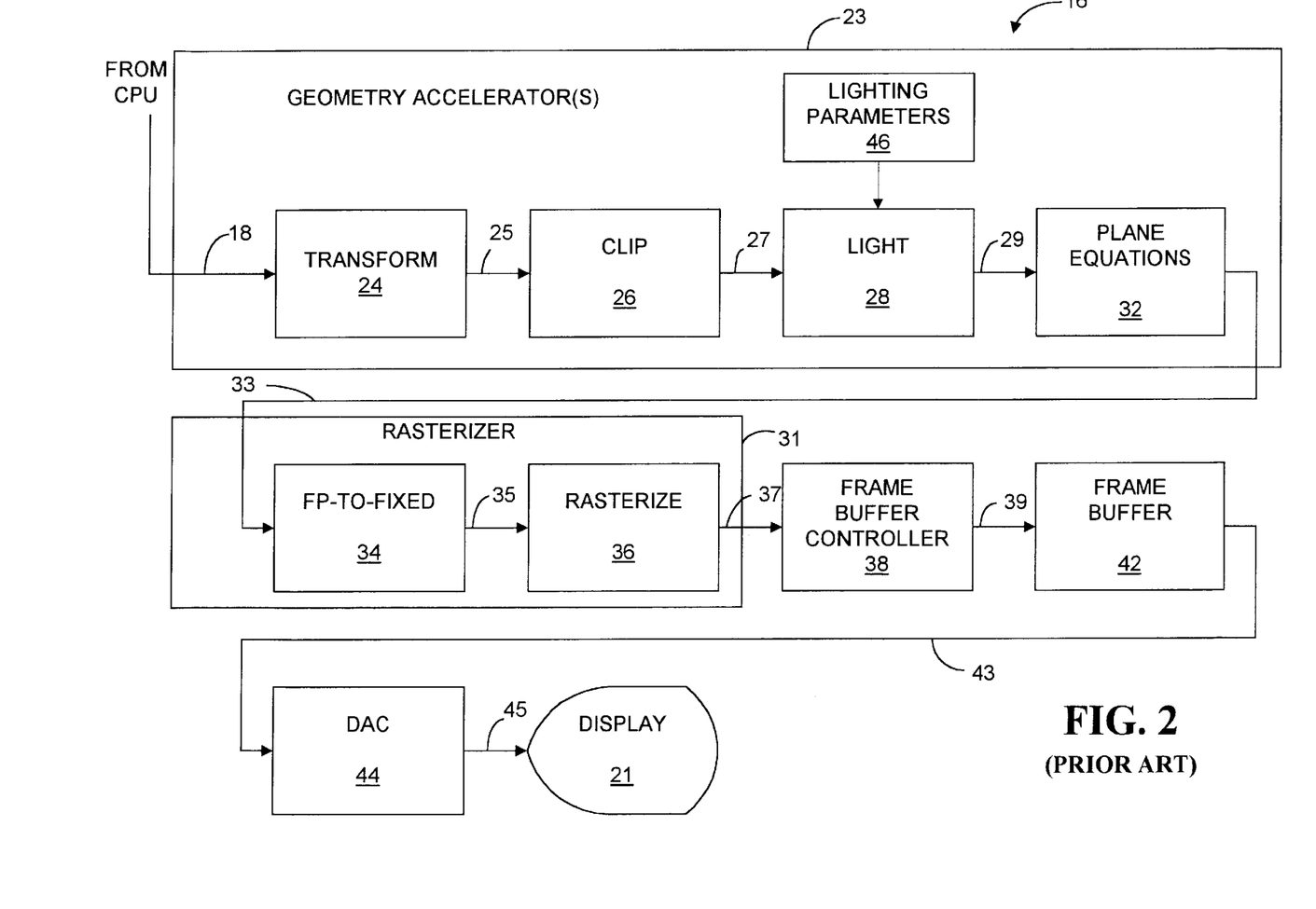
FIG. 2 illustrates a block diagram of a geometry accelerator and rasterizer of a computer graphics system as is known in the prior art.

Having set forth some basic definitions relevant to the art of the present invention, and before turning to the description of the presently preferred embodiment, some fundamental components of a computer graphics pipeline are first discussed. In this regard, the basic components of a conventional computer graphics display system are shown in FIGS. 1 and 2. The computer graphics display system 16 comprises a geometry accelerator 23, a rasterizer 31, a frame buffer controller 38, and a frame buffer 42. The computer graphics display system 16 may also include texture mapping hardware (not shown). The geometry accelerator 23 receives vertex data from the host CPU 12 that defines the primitives (e.g., triangles) that make up the image to be displayed on the display 21.

The geometry accelerator 23 typically includes a transform component 24, which receives vertex data from the CPU 12, a clipping component 26, an illumination or lighting component 28, and a plane equations component 32. The transform and decomposition component 24 performs transformations on the primitive vertex data received from the CPU 12, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 26 clips the vertex data so that only vertex data relating to primitives that make up the portion of the view that will be seen by the user is kept for further processing. If the vertex data reveals that the entire primitive is outside the viewing window, then all other vertex data may be tossed or ignored. Otherwise, and as is known in the art, new vertices are created at a clip boundary. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 28, hereinafter referred to as a lighting machine, calculates the final colors of the vertices of the primitives based on the both vertex data and on the locations of the light source(s) and the viewer relative to the object being displayed. This information is introduced to the lighting machine 28 through lighting parameters 46. While the lighting parameters 46 is illustrated as a separate block, it will be appreciated that this block is preferably implemented by a section of memory dedicated to storing the various lighting parameters (discussed below). The system CPU 12, through software, ultimately conveys the data for these parameters to the graphics accelerator 23 and its memory.

The plane equations component 32 generates floating point equations which define the image space within the vertices on the display screen. That is, the plane equations component 32 specifies how to illuminate pixels between the vertices. The floating point equations are converted into fixed point equations by floating point to fixed point component 34 before being rasterized. The rasterizing component 36 of rasterizer 31 and the texture mapping hardware (not shown) generate the final screen coordinates and color data for each pixel in each primitive. The pixel data is stored in a frame buffer 42 for display on a video display screen 21.

As will be appreciated by persons skilled in the art, the preferred embodiment of the present invention is implemented as micro-coded segments in the OpenGL pipeline. In this embodiment, the micro-coded segments are functionally disposed between the transform 24 and clip 26 blocks. Alternatively, and as previously mentioned, the present invention may be implemented within an entirely software graphics pipeline. In such an embodiment, the inventive segments will be implemented in software routines, as will the other blocks of the graphics pipeline, illustrated as part of the geometry accelerator chip in FIG. 2.

Figure 3:
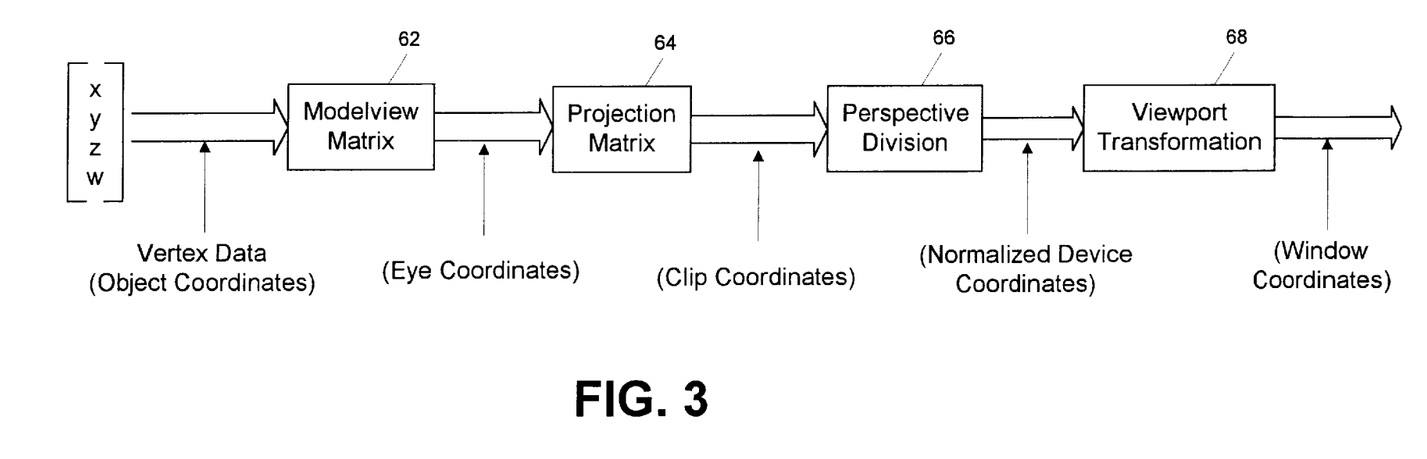
FIG. 3 is a block diagram illustrating the various transformations and coordinate systems in a typical computer graphics environment.

Having summarized the principal elements of a computer graphics pipeline, reference is now made to FIG. 3, which illustrates the incremental transformations from vertex data in object coordinates to window coordinates. Graphics primitives are defined initially by primitive vertices. Each vertex is defined by four coordinates (X Y, Z, W). The first transformation that is made to the object coordinates is performed by the modelview matrix 62. The modelview matrix performs viewing and modeling transformations. The viewing transformation essentially orients the viewing scene. In this regard, the viewing transformation is often analogized to the step of positioning and aiming a camera, if taking photographs. The modeling transformation permits the rotation, translation, and/or scaling of the model.

The result of the transformation performed by the modelview matrix 62 is in eye coordinates. The next transformation that is made to the vertex data is performed by the projection matrix 64. In keeping with the camera/photography analogy, specifying the projection transformation is like choosing a lens for the camera (e.g., wide-angle or telephoto). Specifying this transformation determines the field of view and, thus, what objects are within the field of view. In addition, specifying the projection transformation also determines the manner in which objects are projected onto the viewing screen (e.g., perspective projection).

The result of the transformation performed by the projection matrix 64 is in clip coordinates. After the projection transformation, perspective division 66 is performed by block 66. This is the division of X, Y, and Z, by W. It is carried out in clip coordinates, and the result is provided in normalized device coordinates.

Finally, the last transformation illustrated is the viewport transformation 68. Together with the projection transformation, the viewport transformation 68 determines how a scene gets mapped onto the viewing screen of the computer display. The projection transformation defines how the mapping should occur, and the viewport transformation specifies the shape of the screen area into which the scene is mapped. Again referring to the camera example, this is akin to determining the size of the final photograph.

As previously mentioned, graphics polygons have both a front face and a back face. In systems known in the prior art, whether the front face or back face of a given polygon is visible was essentially determined after the polygon was projected onto the window. After this projection, if the polygon's edges are directed clockwise, then a front face is visible. If the edges are directed counterclockwise, the opposite face is visible. Prior systems made this determination in window coordinates, which, as described previously, resulted in additional and unnecessary computations, if the primitive is to be culled out.

Figure 4:
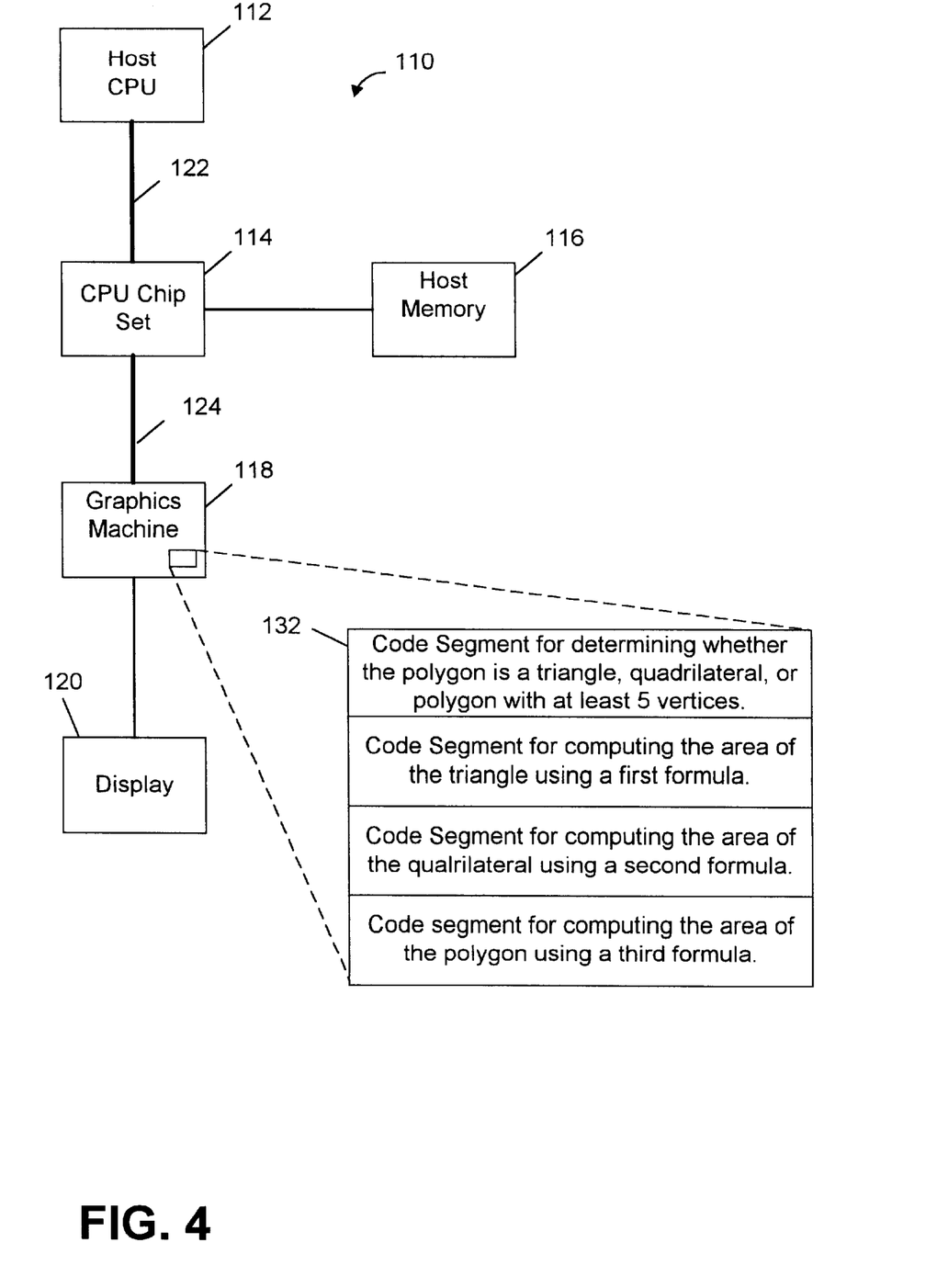
FIG. 4 is a block diagram illustrating fundamental blocks in a computer graphics system, and illustrating certain code segments within the graphics machine of the present invention.

In accordance with one aspect of the present invention, this determination is made in clip coordinates. That is, prior to the viewport transformation 68. Before discussing the specific method of the preferred embodiment, reference is made briefly to FIG. 4, which illustrates a block diagram of a portion of a computer graphics system, generally designated by reference numeral 110. A central processing unit (CPU) 112, such as a microprocessor, provides the primary processing capabilities of most computing systems. As is known, the CPU 112 generally interfaces with other devices through support circuitry, which is designated as a CPU Chip Set 114. As is known and understood, this CPU chip set 114 often includes bus drivers, latches, chip enable circuitry, direct memory access (DMA) controllers, etc. Also illustrated in FIG. 4 is a host memory 116, a graphics machine 118 (which includes a geometry accelerator), and a display 120, such as a cathode ray tube (CRT) or a liquid crystal display (LCD).

A CPU bus 122 extends between the CPU 12 and the various components of the CPU chip set 114. Data or other information that passes to or from the CPU 112 to other circuit components is communicated across the CPU bus 122. For example, data exchanges between the CPU 112 and the memory 116 occur via the CPU bus 122. Likewise, a graphics bus 124 typically extends between the graphics machine 118 and the various components of the CPU chip set 114. Data or other information that passes to or from the graphics machine 118 to other circuit components occur via the graphics bus 124.

As will be further described below, the preferred embodiment of the present invention is implemented through microcode within the graphics machine 118 (although in may be entirely implemented in software in an alternative embodiment, consistent with the concepts of the invention). Specifically, the invention may be viewed as a number of code segments 132 that provide the functionality of different steps of the present invention. FIG. 4 illustrates a non-exclusive list of such segments, which include a code segment for determining whether a polygon is a triangle, quadrilateral, or a polygon with more than four vertices. Another code segment computes the area of the polygon using a first formula. This code segment is invoked when the polygon is determined to be a triangle. Another code segment computes the area of the polygon using a second formula. This code segment is invoked when the polygon is determined to be a quadrilateral. Another code segment computes the area of the polygon using a third formula. This code segment is invoked when the polygon is determined to have more than four vertices.

Consistent with the broader aspects of the invention, however, an alternative embodiment may be implemented in a software, as part of a software graphics pipeline. In such an embodiment, and as will be appreciated by those skilled in the art, the functionality implemented in the micro-coded segments described above will instead be implemented in software. In addition, the hardware elements illustrated in FIG. 2 (and described in connection therewith) as a part of the geometry accelerator, as implemented in software as well.

Figure 5:
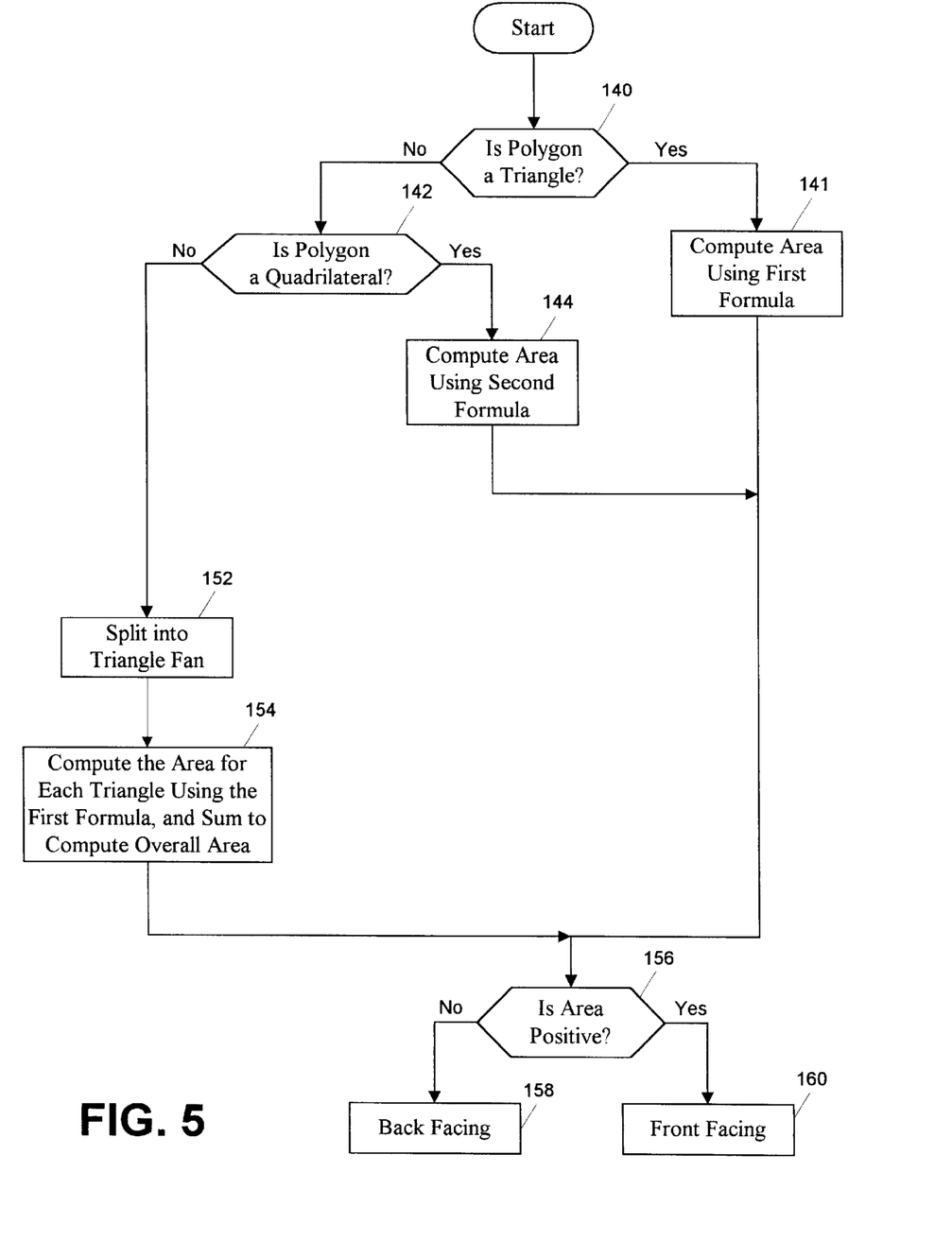
FIG. 5 is a flowchart illustrating the top-level functional operation of the present invention.

Reference is now made to FIG. 5, which presents a flowchart illustrating the top-level functional operation of the present invention. The preferred embodiment of the present invention begins by evaluating the polygon upon which it is to determine whether is front facing or back facing. Specifically, the invention determines whether the polygon is a triangle (step 140), a quadrilateral (step 142), or a polygon having more than four vertices. If the polygon is determined to be a triangle, then the area of the triangle is computed using a first formula (step 141). Preferably, this first formula is defined by the following equation:

$$\text{Area} = W_2(X_0Y_1 - X_1Y_0) + W_1(X_2Y_0 - X_0Y_2) + W_0(X_1Y_2 - X_2Y_1), \quad \text{(Equation 2)}$$

where $W_0$, $W_1$, and $W_2$ are the fourth coordinates of the homogeneous coordinates defining vertices $V_0$, $V_1$, $V_2$, respectively, of the triangle defined by vertices $V_0$, $V_1$, and $V_2$. It will be appreciated, however, that the foregoing equation does not calculate the actual area of the triangle, but rather computes a value that is proportional to the area (e.g., does not multiply by ½). However, since the significance of the calculation is to ascertain the sign (i.e., positive or negative) of the area, the above calculation is sufficient.

If, instead of a triangle, the polygon is determined to be a quadrilateral, then the area is computed using a second formula (step 144). In accordance with the preferred embodiment, the quadrilateral (defined by vertices V0, V1, V2, and V3) is split into two triangles, wherein the first triangle is defined by vertices V0, V1, and V2 and the second triangle is defined by vertices V2, V3, V0. The first formula of Equation 2 is then used to compute the area of each of the two triangles, and the individual areas are summed to compute a single, overall area according to the following equation:

$$\text{Area} = \text{Area1} * |W3| + \text{Area2} * |W1|, \quad \text{(Equation 3)}$$

where Area1 is the area of the first triangle and Area2 is the area of the second triangle, and W1 and W3 are the fourth coordinates of the first and third vertices, respectively, in the homogenous coordinates system.

If the polygon is determined to have more than four vertices, then the polygon is split into at least two constituent, convex polygons (step 148). The total polygon area is then calculated by computing the area of each of the constituent polygons (using the methodology and formulas described above)(step 150). Specifically, it is split into a triangle fan (step 152). Then, the area of each constituent triangle is computed using the first formula of Equation 2 (above)(step 154). These constituent areas are then weighted and summed to compute an overall area. Specifically, the constituent areas are weighted by dividing each individual area by the magnitude of the product of $W_0$, $W_1$, and $W_2$ (e.g., $\text{Area}/|W_0 W_1 W_2|$).

Once an overall area is computed for the polygon, the sign of the area is evaluated (i.e., is the area greater than or less than zero), to determine whether it is front facing or back facing (step 156). Of course, this determination depends upon sign convention, but in the illustrated embodiment a negative area indicates a back facing polygon (step 158) and a positive area indicates a front facing polygon (step 160).

The algorithm of the preferred embodiment operates under the assumption that portions of a polygon may be clipped away (a negative value for w indicates points behind the eye and which will be clipped). Accordingly, in determining the orientation of a polygon (i.e., front facing or back facing), preferably its orientation is known for at least that portion that is in positive w space. Thus, the polygon should have at least one point with a positive w value. Otherwise the entire polygon will be clipped and the computations of the invention need not be performed.

As previously mentioned, the present invention performs its calculations in clip coordinates. Preferably, in the case of a triangle or quadrilateral primitive, the product components of the calculation are weighted by appropriate W-coordinates, so that the area is effectively being calculated in normalized device coordinates, but without the requirement to divide by the W coordinates (perspective division), since the process of division is time consuming in computer hardware. In the case of a general polygon, however, division is implemented. More particularly (for the triangle case), for vertices $V_0$, $V_1$, and $V_2$, where vertex $V_i$ has homogeneous clip coordinates $[X_i, Y_i, Z_i, W_i]$, the area calculated by the first formula (Equation 2) is:

$$\text{Area} = 2 * \text{NDCarea} * |W_0 * W_1 * W_2|, \quad \text{(Equation 4)}$$

where NDCarea is the area in normalized device coordinates. Since normalized device coordinates transform to window coordinates with a simple scale and translate (viewport transformation), the orientation is preserved, and it is valid to calculate a normalized device coordinate area rather than the window coordinate area of the prior art.

Figure 7:
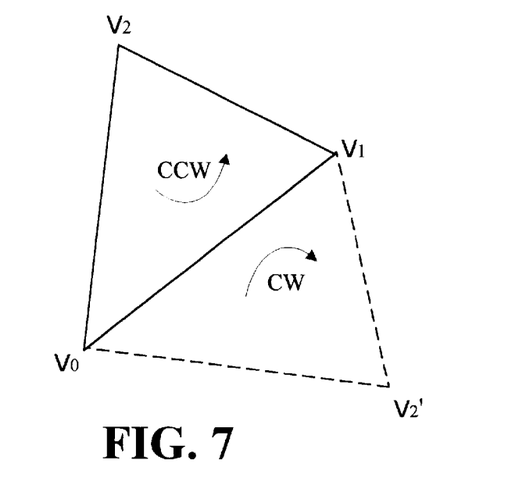
FIG. 7 is a block diagram illustrating the reflection of a triangle across the W=0 boundary.

It should be appreciated that the area calculation of Equation 2 provides the correct sign regardless of the sign of the W's. For example, and referring briefly to FIG. 7, reflecting one point ($V_2 \rightarrow V_2'$) across the W=0 boundary causes the is orientation of three points ($V_0$, $V_1$, and $V_2$) to be reversed. If vertex $V_i$ has a negative W, then the point $V_i'$ (reflected) represents a point in the direction of $V_i$ (from another vertex where w is positive) which still has a positive W. Accordingly, using vertex $V_i$, and doing no reversals of area sign based W signs, provides the correct result in every case. The foregoing, however, necessarily holds true only for triangles. Therefore, quadrilaterals and larger polygons are first split into triangles before performing the area calculations.

Figure 6:
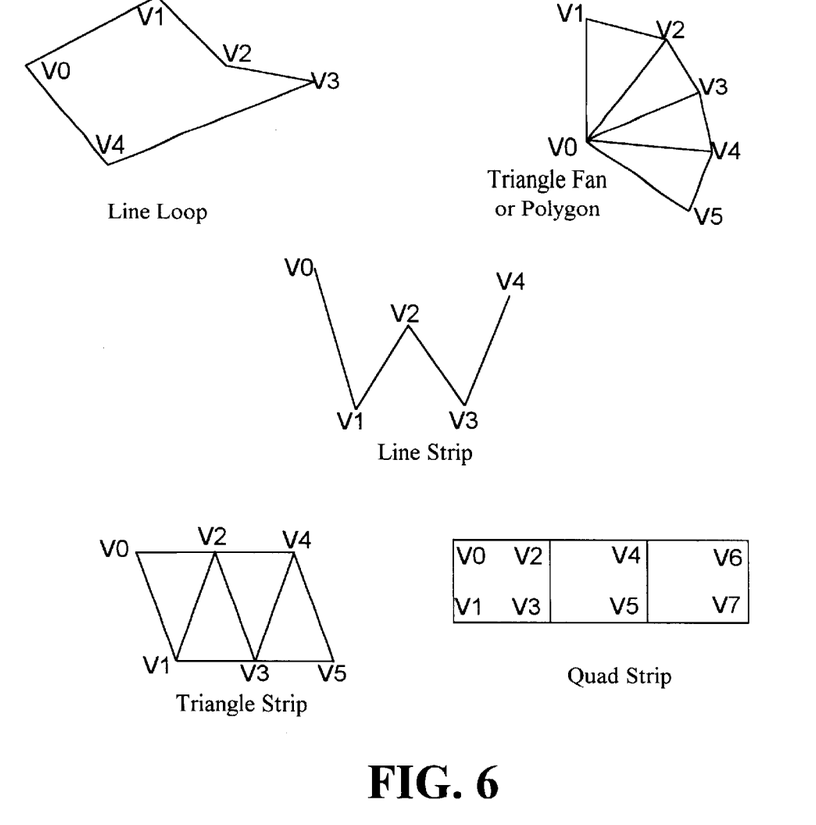
FIG. 6 illustrates several of the more complex graphics primitives.

Having illustrated the basic architecture of the present invention and having discussed the method of the present invention, reference is now made briefly to FIG. 6, which illustrates various graphics primitives utilized in computer graphics, and briefly described in Table 1 below.

TABLE 1

| Primitive Type | Mapping | Description |
|---|---|---|
| point | point | 1 vertex-draws 1 pixel on the screen |
| line | vector | Two vertices-draws a line between the 2 vertices. |
| line loop | vector | n vertices-draws a line between $V_0$ and $V_1$, then $V_1$ to $V_2$, . . ., $V_{n-1}$ to $V_n$, to $V_0$ (one vertex shared from the last vector until the last vector for which the last vertex is combined with the first vertex to close off the loop) |
| line strip | vector | n vertices-draws a line between $V_0$ and $V_1$, then $V_1$ to $V_2$, . . ., $V_{n-1}$ to $V_n$ (one vertex shared from the last vector) |
| triangle | triangle | 3 vertices-draws a triangle using the 3 vertices. |
| Triangle fan | triangle | n vertices-draws a triangle after the first three vertices then another triangle for each additional vertex. The first vertex, $V_0$, is shared with all triangles and the last vertex sent is common to the next triangle as well. Draws n-2 triangles. |
| Triangle strip | triangle | n vertices-draws a triangle after the first 3 vertices then another triangle for each additional vertex. The last 2 vertices sent are combined with the next vertex sent to form the 3 vertices of the triangle. Draws n-2 triangles. |
| Quad | quad | 4 vertices-draws a quadrilateral (2 triangles) |
| quad strip | quad | n vertices-draws a quad after the first 4 vertices then every 2 vertices draws another quad by combining the 2 new vertices with the last 2 vertices sent. Draws (n/2) − 1 quads. |

TABLE 1-continued

| Primitive Type | Mapping | Description |
|---|---|---|
| Polygon | polygon | n vertices (where n is at least 3) - draws a simple convex polygon using the points $V_0, \ldots, V_{n-1}$ as vertices. |

Triangle fan and triangle strip primitives are processed, in accordance with the inventive concepts described herein, as a series of triangles. Similarly, quad strip primitives are processed as a series of quadrilaterals.

While the foregoing has given a basic description of image generation and primitive manipulation in a graphics accelerator, it should be appreciated that many areas have been touched upon only briefly. A more complete and detailed understanding will be appreciated by those skilled in the art, and is accessible from readily-available sources. For example, the graphics accelerator of the presently preferred embodiment is designed for operation in systems that employ OpenGL, which is a well known graphics application program interface (API). Indeed, there are many references which provide a more detailed understanding of graphics generally, and OpenGL specifically. One such reference is entitled OpenGL Programming Guide, by OpenGL Architecture Review Board—Jackie Neider, Tom Davis, and Mason Woo, an Addison-Wesley Publishing Company, 1993, which is hereby incorporated by reference.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a computer graphics system, a method for processing graphics data comprising the steps of:

processing a plurality of polygons comprising a graphics image into clip coordinates;

defining, individually, which of the polygons are front facing polygons and which of the polygons are back facing polygons, wherein the defining step further includes;

determining whether the polygon is a triangle, a quadrilateral, or a polygon with more than four vertices;

computing the area of the polygon using a first formula, if the determining step determines the polygon to be a triangle;

computing the area of the polygon using a second formula, if the determining step determines the polygon to be a quadrilateral;

computing the area of the polygon using a third formula, if the determining step determines the polygon to be a polygon with more than four vertices, wherein the first, second and third formulas are different from each other;

eliminating the back facing polygons;

transforming to window coordinates the front facing polygons;

clipping the transformed polygons; and processing the front facing polygons in an area for display, wherein the front facing polygons will be displayed as graphic images which are visible to an observer.

2. The method as defined in claim 1, wherein the first formula is:

$$\text{Area} = W_2(X_0Y_1 - X_1Y_0) + W_1(X_2Y_0 - X_0Y_2) + W_0(X_1Y_2 - X_2Y_1),$$

where $X_i, Y_i, Z_i, W_i$ define a vertex $V_i$ in homogeneous coordinates.

3. The method as defined in claim 1, wherein the second formula includes the step of triangulating the quadrilateral into two triangles defined by vertices V0, V1, V2 and V0, V2, V3, wherein the quadrilateral is defined by vertices V0, V1, V2, V3.

4. The method as defined in claim 3, wherein the second formula computes the area of the quadrilateral according to the formula: $\text{Area} = \text{Area1}*|W_3| + \text{Area2}*|W_1|$, wherein Area1 and Area2 are computed using the first formula, and $W_1$ and $W_3$ are the homogeneous coordinates for the vertices $V_1$ and $V_3$, respectively.

5. The method as defined in claim 1, wherein the third formula includes the step of dividing the polygon into a triangle fan graphics primitive.

6. The method as defined in claim 5, wherein the third formula includes the step of computing the area of a plurality of the triangles comprising the triangle fan graphics primitive.

7. The method as defined in claim 6, wherein the third formula includes the step of comparing the area of the plurality of the triangles.

8. The method as defined in claim 5, wherein the third formula includes the step of computing the area of all of the triangles comprising the triangle fan graphics primitive.

9. The method as defined in claim 8, wherein the third formula includes the step of summing the areas of the individual triangles to compute an overall area for the polygon.

10. The method as defined in claim 8, wherein the step of computing the area for all of the triangles computes the areas using the first formula along with a weighting factor defined as:

$$\text{Area} = W_2(X_0Y_1 - X_1Y_0) + W_1(X_2Y_0 - X_0Y_2) + W_0(X_1Y_2 - X_2Y_1) / |W_0W_1W_2|,$$

where $X_i$, $Y_i$, $Z_i$, $W_i$ define a vertex $V_i$ in homogeneous coordinates.

11. In a computer graphics system, a method for processing a graphics data comprising the steps of:

evaluating in clip coordinates a plurality of polygons comprising a graphics image, to identify those polygons that are not visible;

eliminating the not visible polygons identified in the evaluating step;

transforming to window coordinates the polygons comprising the graphics image and which are visible to an observer;

clipping the transformed visible polygons; and processing the visible polygons for display.

12. The method as defined in claim 11, wherein the evaluating step includes the step determining, individually, which of the polygons are front facing polygons and which of the polygons are back facing polygons.

13. The method as defined in claim 12, wherein the step of determining includes the step of calculating the area, individually, of the polygons.

14. The method as defined in claim 12, wherein the area of a triangle polygon is calculated according to a first formula.

15. The method as defined in claim 12, wherein the area of a quadrilateral polygon is calculated according to a second formula.

16. The method as defined in claim 12, wherein the area of a polygon having at least five vertices is calculated according to a third formula.

17. In a computer graphics system, an apparatus for processing graphics data comprising:
 means for processing a plurality of polygons comprising a graphics image into clip coordinates;
 means for defining, individually, which of the polygons are front facing polygons and which of the polygons are back facing polygons, wherein the means for defining further includes;
  means for determining whether the polygon is a triangle, a quadrilateral, or a polygon with more than four vertices;
  first means responsive to the means for determining for computing the area of the polygon using a first formula, if the polygon is determined to be a triangle;
  second means responsive to the means for determining for computing the area of the polygon using a second formula, if the polygon is determined to be a quadrilateral;
  third means responsive to the means for determining for computing the area of the polygon using a third formula, if the polygon is determined to be a polygon with more than four vertices, the first, second and third formulas being different from each other;
 means for eliminating the back facing polygons;
 means for transforming to window coordinates the front facing polygons;
 means for clipping the transformed front facing polygons; and
 means for processing the front facing polygons in an area for display,
wherein the front facing polygons will be displayed as graphic images which are visible to an observer.

18. The apparatus as defined in claim 17, wherein the means for determining includes at least one segment of micro-code residing in an integrated circuit chip.

19. The apparatus as defined in claim 17, wherein the first means includes at least one segment of micro-code residing in an integrated circuit chip.

20. The apparatus as defined in claim 17, wherein the second means includes at least one segment of micro-code residing in an integrated circuit chip.

21. The apparatus as defined in claim 17, wherein the third means includes at least one segment of micro-code residing in an integrated circuit chip.

22. The apparatus as defined in claim 17, wherein the means for determining, the first means, the second means, and the third means are all implement in software code.

23. In a computer graphics system, a micro-coded apparatus for processing graphics data comprising:
 a first code segment configured to process a plurality of polygons comprising a graphics image into clip coordinates;
 a second code segment configured to define, individually which of the polygons are front facing polygons and which of the polygons are back facing polygons, wherein the second code segment further includes;
  a code segment configured to determine whether the polygon is a triangle, a quadrilateral, or a polygon with more than four vertices;
  a code segment configured to compute the area of the polygon using a first formula, if the polygon is determined to be a triangle;
  a code segment configured to compute the area of the polygon using a second formula, if the polygon is determined to be a quadrilateral;
  a code segment configured to compute the area of the polygon using a third formula, if the polygon is determined to be a polygon having more than four vertices, the first, second and third formulas being different from each other;
 a third code segment configured to eliminate the back facing polygons;
 a fourth code segment configured to transform to window coordinates the front facing polygons; and
 a fifth code segment for processing the front facing polygons for display,
wherein the front facing polygons will be displayed as graphic images which are visible to an observer.

* * * * *